Figure 1:
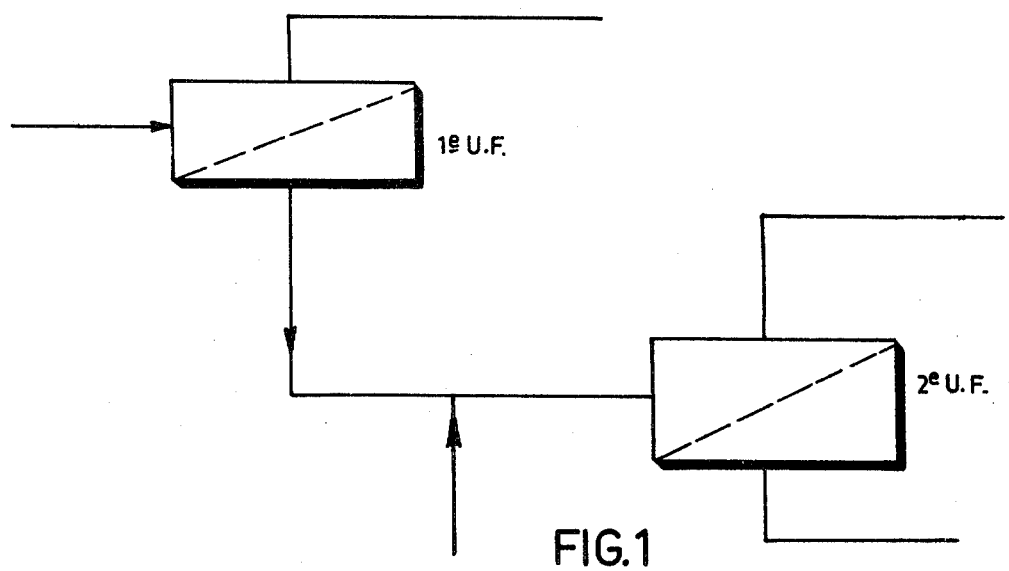

United States Patent [19]

Roger et al.

[11] Patent Number: 4,485,040

[45] Date of Patent: Nov. 27, 1984

[54] PROCESS FOR OBTAINING AN α-LACTALBUMIN ENRICHED PRODUCT FROM WHEY, AND USES THEREOF

[75] Inventors: Loïc Roger, Rennes; Jean-Louis Maubois, La Barre-Guibourg; Gérard Brulè; Michel Piot, both of Rennes, all of France

[73] Assignee: Institut National de la Recherche Agronomique, Paris, France

[21] Appl. No.: 338,136

[22] Filed: Jan. 8, 1982

Related U.S. Application Data

[63] Continuation of Ser. No. 162,641, Jun. 24, 1980, abandoned.

[30] Foreign Application Priority Data

Jun. 26, 1979 [FR] France ............................ 79 16482

[51] Int. Cl.$^3$ ................................................ C07G 7/00
[52] U.S. Cl. ............................. 260/122; 260/112 R; 260/120
[58] Field of Search ................... 260/112 R, 122, 120

[56] References Cited

U.S. PATENT DOCUMENTS

| | | | |
|---|---|---|---|
| 4,036,999 | 7/1977 | Grindstaff | 426/583 |
| 4,042,575 | 8/1977 | Eustache | 260/112 R |
| 4,163,069 | 7/1979 | Melachouris | 426/583 |
| 4,265,924 | 5/1981 | Buhler | 260/122 |

OTHER PUBLICATIONS

D. Lee & L. Merson "Prefiltration of Cottage Cheese Whey to Reduce Fouling of Ultrafiltration Membranes" J. Food Science, vol. 41, pp. 403–410 1976.

*Primary Examiner*—John C. Bleutge
*Assistant Examiner*—Patricia Short
*Attorney, Agent, or Firm*—Oblon, Fisher, Spivak, McClellan & Maier

[57] ABSTRACT

A process of obtaining a α-lactalbumin enriched product from whey of various origins is disclosed. A first ultrafiltration is carried out on unpasteurized raw whey with membranes having cut-off greater than 5,000 (e.g. 50,000) at a pH between 6.3 and 7 (e.g. 6.6) and a temperature between 30° and 60° C. thereby retaining whey proteins. The ultrafiltrate then undergoes a second ultrafiltration with a membrane capable of retaining α-lactalbumin (cut-off about 1,200 and 2,000) which is preferably diafiltration. Depending on whether starting whey is acid whey or sweet whey the resulting product may contain practically no CMP or some (e.g. 25%). The resulting product is useful as a mother's milk substitute, pharmaceutical, intensive care or therapeutic food, or tryptophan enriched nutrient.

26 Claims, 3 Drawing Figures

PROCESS FOR OBTAINING AN α-LACTALBUMIN ENRICHED PRODUCT FROM WHEY, AND USES THEREOF

This is a continuation of application Ser. No. 160,641, filed June 24, 1980, now abandoned.

This invention relates to the field of treatment of whey with a view to extracting valuable products.

Whey is a well-known by-product of the cheese-making industry. The composition of whey is approximately that of skim milk without its casein. In general, two main types of whey may be distinguished, sweet wheys, or cheese plant wheys, and acid wheys or casein plant wheys.

The addition of rennet to milk causes syneresis which results in a whey called rennet whey. If the renneting occurs at a pH of milk or at a slightly lower pH for example after slight maturation by lactic yeasts, but above a range of about 5.8 to 6, the whey is designated sweet whey. Moreover, the acidification of milk either by adding a mineral acid or by producing lactic acid (seeding milk with lactic ferments) at a pH near the isoelectric point of the caseins, causes the flocculation or coagulation thereof. After separation of the curd, an acid whey is obtained.

Whey is therefore defined with respect to the nature of the coagulation of the milk. In the cheese industry most of the wheys are in fact mixed wheys where one of the coagulation processes prevails over another. The sweet wheys come from the manufacture of cheeses called (cooked or uncooked) pressed curd (Emmental, Gruyere, Cheddar, Cantal, Saint-Paulin etc. . . . ). Acid wheys are chiefly the by-products of the manufacture of fresh curds and casein plants. Intermediate varieties are also found which are the by-products of the fabrication of most soft curds and marbled curds (blue cheese). Thus, the composition of wheys is subject to wide variations which mainly depend upon the original milk and the cheese-making procedures used.

Wheys have interesting constituents, notably the nitrogenous fraction which essentially comprises soluble milk proteins which have an elevated biological value, greater than 90%. Reference can be made to the article by E. FORSUM and L. HAMBRAEUS, Nutritional and Biological Studies of Whey Products, J. of Dairy Sc., 60 (3), 370–377, 1977. Heretofore the three traditional destinations of wheys were spreading on fields, dumping in waterways and feeding animals. But the interest is now in new technologies involving, for example, ultrafiltration which permits separation, concentration and purification of the whey components selectively and modification of their physical-chemical properties while maintaining and even improving their nutritional quality. At the present time more and more research is directed to techniques of treating whey permitting the preparation of novel and varied products capable of finding uses as foodstuffs. Workers in the field have a particular interest in the proteins contained in the whey in order to obtain varied food products capable of satisfying specific requirements.

Numerous documents of the prior art illustrate treatments of whey by ultrafiltration. In the cheese-making field it has already been proposed to ultrafiltrate the whey to produce a "retenate" (which is concentrate held back by the ultrafiltration membrane) containing soluble proteins, the retenate then being reintroduced into the cheese in the process of fabrication. Yet there are whey ultrafiltration processes which permit differential or selective separation of various components. The process according to the present invention falls into the latter category.

An object of the invention is a process for obtaining from whey by ultrafiltration, a α-lactalbumin enriched product. Although in relative terms the proteins represent a small part of the solids contents of the whey (less than 12%) they are the main attraction for increasing the value of this by-product. The proteinaceous fraction essentially comprising soluble milk proteins : β-lactoglobulin, α-lactalbumin, serum albumin and immunoglobulins, is interesting by reason of its nutritional value and its functional properties.

Numerous works exist on the characterization of the soluble proteins in whey. As regards β-lactoglobulin reference may be made to the work by G. Braunitzer R. Chen, B. Shrank, A. Stangl, Automatic Sequence Analysis of Protein (β-lactoglobulin AB), Hoppe Seyier's Z. Physiol. Chem. 353 (5),832–834, 1972. Briefly, it may be observed that the β-lactoglobulin, by reason of the presence of a free SH group, has the tendency to polymerize and to exist in the form of a monomer-dimer-octamer equilibrium. The dimer from prevails in general in ultrafiltration conditions and at low temperature at pHs closer to the isolectric point (pH about 5 favors octamerizaton). At a pH greater than 7.5 the balance tips in the favor of the monomer form. The conformation of the β-lactoglobulin is relatively stable below pH 7. H. A. McKenzie, Milk Proteins, vols 1 and 2, Academic Press, New York, 1970, made a study of the forms and characteristics of β-lactoglobulin. The effect of the pH on the conformation of this protein has been confirmed (see, for example, E. Mihalyi, Application of Proteolytic Enzyme to Protein Structure, 1972).

As for α-lactalbumin its sequence is generally known, see K. Brew, F. J. Castellino, T. C. Vanamam, R. L. Hill. The Complete Amino Acid Sequence of Bovine α-Lactalbumin, J. Biol. Chem. 245 (17), 4570–4582, 1973. Contrary to β-lactoglobulin it does not have a free SH group. The work of D. N. Lee and R. L. Merson "Prefiltration of Cottage Cheese Whey to Reduce Fouling of Ultrafiltration Membranes", J. Food Sc. 41:403–410, 1976, has demonstrated that the form of the α-lactalbumin molecules may vary in accordance with the pH. At acid pHs the molecules have the tendency to associate in dimer or trimer form. At pHs greater than 8 a polymerization of the protein is also found.

Like β-lactoglobulin, serum albumin possess a free SH group and exists in monomer and dimer forms.

It is also know that the coagulation of milk is obtained by acidification or proteolysis of the K casein. This enzymatic hydrolysis with rennet frees from the whey a phosphoglycopeptide called caseinomacropeptide (CMP). The quantity of CMP in wheys varies according to the nature and the coagulation time, it may attain at the utmost 1 g/l in sweet whey.

Numerous other soluble proteins exist in milk and wheys. Their presence in smaller quantities than the preceeding makes them less important by their contribution to the physical-chemistry of the protein concentrate of whey than their biological role.

The oldest technique for extracting proteins from whey consists of making them insoluble by a denaturing heat treatment at a pH close to their isoelectric point. This process, which is widely used was recently reviewed by B. P. Robinson, J. L. Short, K. R. Marshall, Traditional Lactalbumin Manufacture, Properties and Uses, N.Z. J. Dairy Sc. and Techn., 11 (2), 114–126, 1976. The drawback of this technique is obviously its denaturing aspect. Other laboratory processes have essentially tried to remedy this drawback. It has, for example, been proposed to carry out an adsorption of proteins in an ion exchanger (J. B. Ward, Separation Processes in the Biological Industry, Process Biochemistry, 11 (7), 1976. The ion exchange technique entails automation and continuous operation difficulties, great investments (amounts of resin eluent, concentration of eluates). The obtention of purified products is not always an advantage.

Other processes call upon chemical extractions and do not give total satisfaction from the nutritional standpoint. Chromatographic ion exchange processes have also been suggested (see B. Mirabel, Nouveau procédé d'Extraction des Protéines du Lactosérum, Ann. de la Nutrition et de l'Alimentation, 34 (2–3), 243–253, 1978. Filtration through a gel has also been used, but essentially in the laboratory. Reference may be had, for example, to the work of L. O. Lindquist and K. W. Williams, Aspects of Whey Processing by Gel Filtration, Dairy Industries, 38 (10), 459–464, 1973, and the work of E. Forsum, L. Hambraeus, and I. H. Siddiqt, Large Scale Fractionation of whey Protein Concentrates J. of Dairy Sc., 57 (6), 659–664, 1974. The processing by gel filtration. has a number of drawbacks. It requires, notably, a preconcentration of proteins which must not be denatured at the risk of altering the resolution between the different fractions. These fractions must then be concentrated and dried. The inferior mechanical properties of gels and the clogging capacity of whey concentrates by reason of the presence of lipoprotein complexes have made this procedure very limited.

Ultrafiltration through a membrane, given the progress made with regard to both apparats and their performance, has become widely used in the dairy industry both for treating milk and whey (see, for example, the work or Mocquot et al, Préparation de Fromage à Partir de "Préfromage liquide" obtenu par Ultrafiltration du Lait, Le Lait, 51 (508) 495–533, 1971.

During the filtering of whey through an ultrafiltration membrane, the water, soluble mineral salts and water-soluble vitamins pass through the membrane. The product which passes through the membrane is known as the ultrafiltrate or permeate. On the other hand the proteins and associated constituents (calcium, phosphorus), fat globules and lipophilic elements are held back or retained and are concentrated as the aqueous phase is eliminated. These constituents are known as the "retentate" or protein concentrate. The protein concentrates obtained by ultrafiltration may be defined either by the concentration factor or by the degree of purity of the proteins. The obtention of high purity concentrates necessitates the application of ultrafiltration followed or accompanied by diafiltration which consists in washing the protein concentrates. During diafiltration the liquid to be ultrafiltrated is brought into contact with the membrane at the same time as the solution, e.g., an aqueous solution. Numerous studies have been made on the composition of the whey ultrafiltrate. [See, for example, Hargrove et al. Production and Properties of Deproteinized Whey Powders, J. of Dairy Sc., 59 (1), 5–33, 1976, Hiddink et al Ultrafiltration of Condensed Whey, Zuivelzicht 68 (48–51), 1064–1066, 1126–1127, 1978; L. Kivieniemi, Microbial Growth During the Ultrafiltration of Sweet Whey and Skim Milk, Kemia-Kemi, 12, 791–795, 1974]. The composition of retentates or protein concentrates has also been determined. (See, for example B. S. Horton, R. L. Goldsmith and R. R. Zall, Membrane Processing of Cheese Whey Reaches Commercial Scale, Food Technol. 26 (30), 1972.

The actual conditions of ultrafiltration are such that it does not proceed according to ideal hypotheses. For instance, the ultrafiltration retentate has a relatively great residual content of fat as well as of mineral elements. Further, current ultrafiltration membranes have variable pore diameters. Their cut-off capacity is therefore not absolutely accurate and does not correspond to an ideal isoporous membrane. Furthermore the membrane is not inert. The temperature, pressure and pH may modify its physical properties and thereby the diameter of the pores and the hydration of the membrane may vary. Depending on the chemical nature of the membrane, ionic or hydrophobic interactions may develop between with the proteins and/or the minerals. In addition to these types of bonding one must add the possible physical capture of molecules in the pores of the membrane. All these phenomena modify the permeability of the membrane with respect to the ultrafilterable elements and water. Finally, it is necessary to underscore the importance of the formation on the ultrafiltration membrane of a polarization layer also known as a dynamic membrane which mainly comprises proteins. Without mastering this phenomenon any amelioration as regards selectivity of the membranes is largely compromised: see J. Murkes, Quelques Opinions sur les Applications Industrielles de la Technologie des Membranes, Journées Européennes de la Filtration, Paris, Oct. 21, 1978. In other words the capacity of a membrane to satisfy a given function must not be appreciated ideally: the membrane must compulsorily be tested in operating conditions because it is impossible to disregard the polarization layer which forms in the course of ultrafiltration and modifies the transfer of solutes across the membrane, thereby lowering the performance of the apparatus, in particular, the permeation rate. Qualitative changes in the retentate and permeate may also be observed. This polarization layer serves as a second membrane and the total permeability of the membrane in the course of operation will depend on its thickness and also the nature of its components.

As regards the ultrafiltration of whey, reference may be had to the work by D. N. Lee and R. L. Merson, Prefiltration of Cottage Cheese Whey to Reduce Fouling of Ultrafiltration Membranes, J. of Food Sc. 41, 403–410, 1976. These authors determined a number of conditions which permit the thickness and density of the polarization layer to be minimized in order to improve the permeability of the membrane. They also noted the influence of pH which acts on the solubility of the proteins. It is therefore recommended to adjust the pH to take into account the origin of the whey. See also J. F. Hayes, J. A. Dunkerley, L. L. Muller and A. T. Griffin, Studies on Whey Processing by Ultrafiltration II Improving Permeation Rates by Preventing Fouling, The Australian J. of Dairy Tech. 37 (3), 132–140, 1974. The authors teach the preheating of whey, for example, to 80° C. for 15 seconds, which will have the effect of improving the performance of the apparatus. Generally speaking it is also known to pretreat the wheys, i.e., heat treatment, notably by pasteurizaion to prevent bacterial contamination. Indeed it is known that whey contains 10 to 20% of the bacteria of milk manufactured. Pasteurization has therefore often been recommended to preserve the healthy quality of the whey.

The aforesaid articles by Lee and Merson (1976) and Hayes to which reference may be had if necessary, show that the conditions for ultrafiltering wheys are of great practical importance.

Operations called diafiltration are also known, these operations consist of adding water to the retentate and simultaneously or subsequently eliminating an equivalent amount of permeate. The effect of diafiltration is to reduce the filterable elements from the retentate. It may be a batch process (dilutions followed by successive concentrations) or a continuous (water is added at the same rate as the permeate is eliminated). The diafiltration permits, in general, protein concentrates of enchanced purity to be obtained.

By way of example of references illustrating the prior art in the field of ultrafiltration the following may be cited : French patents Nos 71.04.838 (printed publication No 2.125.137) and 74.24.441 (printed publication No. 2.239.208), Chemical Abstracts, Vol. 81, No. 3, July 22, 1974, p. 218, Abstract No 11969, referring to an article in Sci. Tecnol. Alimenti 1973,3 (4) 209–215 by C. Pompei et al.

The French Pat. No. 71,04,839 relates to the delactosation of milk and proposes a process for producing a milk containing all the constituents of natural milks with the exception of lactose; such a product is useful for feeding diabetics. the disclosed process deals with the milk as a starting material and not whey, and it involves in addition at least one reverse osmosis step. Typically, the process according to French Pat. No. 71,04,839 consists of ultrafiltering milk, recovering the ultrafiltrate, subjecting the ultrafiltrate to reverse osmosis with a view to eliminating the lactose contained therein whereupon the effluent of the reverse osmosis is mixed with the ultrafiltration retentate to provide a reconstituted milk without lactose.

French Pat. No. 74,24,441 proposes to treat milk or whey by ultrafiltration by diluting the retentate with an aqueous solution in order to produce human milks in particular. After ultrafiltration of the whey a product which may be spray dried is obtained which after mixing with sodium caseinate results in an additive which is may be added to the milk to correct or modify the casein/soluble proteins ratio. Such a process therefore involves all the soluble proteins of whey. The article by C. Pompei et al. cited above also proposes treating whey by ultrafiltration to yield a protein concentrate which may be sprayed. Such a process enables all the whey proteins to be isolated but does not teach the fractionation thereof.

Observation of the prior art has shown that the retention of soluble whey proteins by the ultrafiltration membrane as classically used at the present time in industry is not complete. The retention also differs depending on the nature of the proteins.

Thus α-lactalbumin may pass freely through currently used membranes owing to its small molecular weight (14,000–15,000), its compact globular configuration and its inability to polymerize in a undenatured state by reason of the absence of free SH groups. Yet, in actual operating conditions of ultrafiltration a partial retention of 60 lactalbumin is found which is surely due to the presence of the polarization layer of dynamic membrane on the actual membrane. As for β-lactoglobulin which is also found to be partly retained, it passes, across the membrane in its monomer form. pH conditions therefore take on considerable importance.

The invention takes advantage of these observations of the prior art and provides a process which permits, owing to the utilization of a technique of ultrafiltration of whey under industrial conditions, a product very enriched in α-lactalbumin is obtained to the detriment of other proteins soluble in whey.

To this end the invention provides a selective or differential treatment of whey which permits, after successive ultrafiltration, selecting the α-lactalbumin enriched fraction. Each of the ultrafiltration is conducted under predetermined conditions and with predetermined membranes.

Another object of the invention is a product obtained directly by the process, namely an α-lactalbumin enriched fraction.

Another aspect of the invention is the application of this product, in particular in the food and medicine field, as a dairy product substitute or complement, notably by way of a food fulfilling specific nutritional requirements, for example, to give the qualities of mother's milk, for intensive-care by the enteral tract as well as for human or animal therapeutic nutrition.

According to the invention there is provided a process for obtaining an α-lactalbumin enriched product by ultrafiltering whey, the process comprising the steps of effecting a first ultrafiltration of the whey with known membranes having a cut-off generally greater than 5,000, intended to permit the retention of whey proteins called soluble proteins, the first ultrafiltration being carried out on raw whey at a pH equal to at least 6.3 and preferably of the order of 6.6, subjecting the ultrafiltrate from the first ultrafiltration to a second ultrafiltration by bringing the first ultrafiltrate into contact with a membrane capable of retaining α-lactalbumin, preferably having a cut-off less than 5,000 and advantageously between about 1,500 and 2,000, and recovering the retentate of the second ultrafiltration which constitutes the α-lactalbumin enriched product sought.

First of all it is important to define the raw material used in the process according to the invention. The intrinsic nature of the whey may be of any kind whatever insofar as the process is equally applicable to sweet whey from cheese-making and acid wheys. Still the resulting products from each of these starting materials are different. When sweet whey is the starting material an α-lactalbumin enriched product is obtained having a small proportion of β-lactoglobulin and some CMP. On the other hand,/if acid whey is the starting material the α-lactalbumin enriched product has practically no CMP. Thus, depending on the origin of the whey the product resulting from the process may contain more or less or no caseinomacropeptide. It is appropriate to note that CMP exists in two forms:

glycosyl form: composed of two different dractions depending on the nature and amount of branched sugars (galactosamine galactose, N-acetyl-neuraminic acid); and nonglycosyl form.

CMP also contains one or two phosphoserines, no aromatic amino acid (tryptophan, phenylalanine, tyrosine) and is rich in threonine, proline and serine.

It is appropriate to use a whey, regardless of its origin, which has undergone no previous heat treatment of the type which is customarily carried for pasteurization. The objective of this operation is to eliminate possible bacterial contaminants. In the context of the process according to the invention as soon as the whey is collected it is subjected to a conventional skimming operation which is intended to remove the fat which is still present in the raw whey, whereupon it may undergo the first ultrafiltration. It may also be kept for a suitable period of time at low temperature, for example, of the order of 0° to 4° C., while, however, preventing the crystallization of lactose. Of course, during the first ultrafiltration the whey may be heated to increase the yield. For example, the suitable temperature may be of the order of 30° to 60°, preferably of the order of 45° C. But ultrafiltration may also be conducted at ambiant temperature. It is above all important that before or during ultrafiltration the whey is not heated to as high a temperature as involved in conventional pasteurization.

Another important consideration concerning the performance of the first ultrafiltration is with regard to the pH of the whey. According to the invention the pH of the raw whey should be adjusted to a value slightly less than 7, nevertheless at least equal to 6.3 and preferably of the order of 6.6. Taking into account the properties of typical wheys this adjustement is effected conveniently by adding basic reagents. In principle, any base may be used, such a sodium hydroxide, potassium hydroxide, sodium carbonate, potassium carbonate, calcium hydroxide, ammonium hydroxide and other similar basic compounds.

Potassium hydroxide is preferred on account of the ultimate use of the products as foodstuffs.

Moreover the first ultrafiltration is carried out in perfectly known conditions. Any currently available equipment may be used, for example, plate, bundle or tube ultrafiltration modules. The semipermeable membranes used are those already known for retaining or concentrating soluble proteins. In general these membranes have a cut-off greater than 5,000 for example, of the order of 50,000. The nature of the membrane is of no importance. It may be an inorganic or organic membrane. By way of example of organic membranes any porous substrate satisfying the above definition may be used. All these concepts are well known to those skilled in the art of ultrafiltration of milk or whey and therefore need not to be explained further.

In the operating conditions of the first ultrafiltration the membrane behaves like a membrane not designed to concentrate or retain the α-lactalbumin and therefore allows it to pass across the same. At the conclusion of ultrafiltration an α-lactalbumin enriched solution is therefore obtained. Indeed, in such a solution the β-lactoglobulin/α-lactalbumin ratio is inversed as compared to the starting whey. In addition the ultrafiltrate comprises no proteins having a molecular weight greater than about 20,000.

As mentioned above, the first ultrafiltration is conducted in a known manner. If necessary it is possible to have recourse to a preliminary test to determine the exact membrane which suits this step, taking into account its dynamic behavior.

In accordance with the invention the ultra-filtrate separated during the first ultrafiltration is then subjected to a second ultrafiltration during which it is used as a membrane capable of holding back or concentrating the α-lactalbumin. As a general rule such a membrane has a cut-off of less than 5,000 and preferably between about 1,500 and 2,000. The chemical and/or physical nature of the membrane matters little as long as it satisfies the α-lactalbumin retaining condition in the operating conditions of the process according to the invention. In the same way the first ultrafiltration any available ultrafiltration equipment may be employed. Usually it is advantageous to carry out a diafiltration rather than an ultrafiltration, i.e., conduct the ultrafiltration by adding continuously or discontinuously to the ultrafiltrate from the first ultrafiltration an aqueous solution or pure water or an aqueous solution containing mineral salts upstream of the membrane relative to the direction of permeation in the second ultrafiltration.

The second ultrafiltration produces an ultrafiltrate consisting of lactose juice and a retentate of concentrate comprising the sough α-lactalbumin enriched solution. The invention is illustrated by FIG. 1 of the accompanying drawing which schematically illustrates the steps of the process.

The products obtained according to the invention are useful as a foodstuff, in particular a human foodstuff. It is known that human milk contains approximately 40% casein and 60% soluble proteins, but β-lactoglobulin is not one of them. To reconstitute milk which comes as close as possible to human milk it is therefore appropriate that the milk product should no contain any β-lactoglobulin while fulfilling in other respects the composition of mother's milk. The products produced according to the invention therefore satisfy such a need and therefore are suitable for what is called "motherization" of the milk. Moreover, it may be useful to have available an α-lactalbumin enriched product for particular dietary requirements, α-lactalbumin being a protein which has the pecularity of being very rich in tryptophan. In such foodstuff applications the product produced according to the invention may be used as a complement or a substitute for human foods or animal feeds.

The products according to the invention may have other uses by reason of their particular properties. These products are rich in tryptophan which may be used as food for dietary or therapeutic purposes.

In particular in these products the ratio of tryptophan to so-called neutral amino acids (tyrosine + phenylalanine + leucine + isoleucine + valine) is high, in particular, greater than or equal to 0.06. The tyrosine/tryptophan ratio is correspondingly low, in particular, less than 2.5 and may reach values in the vicinity of 1.

The products according to the invention are therefore useable as dietetic products for man or animals. It may also be used as intensive-care products or foodstuffs for patients requiring a specific protein diet. These products satisfy nutritional needs in case of, for example, mucoviscidosis or cystic fibrosis of the pancreas, kidney disorders or for patients having an infection or inflammation of the intestinal wall as well as in the case of considerable tissue destruction after severe traumas or burns.

The products of the invention may also have use in therapeutic nutrition of humans and animals. Earlier work (see in particular the articles by R. J. Wurtmann and J. D. Fernstrom in Nutrition Review, 7 (32),193–200 July 1964, and in The American Journal of Clinical Nutrition, (28), 638–647, June 1975) have demonstrated the possibilities of increasing the tryptophan content available inside the brain cell by varying the amounts and equilibrium of amino acids of ingesta may be of interest from the neuropharmacological strandpoint. The tryptophan is a serotin precursor. Likewise a similar action of the intake of tyrosine and phenylalanine and their equilibrium with respect to other amino acids are capable of affecting the amount of dopamine and noradrenaline. An anorexigenic effect may be observed by increasing the triptophan content alone without diminishing the biological value of the protein mixtures by a balance phenomenon. The same effect may be amplified by always staying within the identical biological value framework while lowering the amount of phenylalanine and tyrosine.

The products of the invention may therefore be used by man or animals with a view to therapeutic nutrition notably for treating obesity by taking advantage of the anorexigenic effect or to regulate eating behavior. Further, the products of the invention may be used to improve pharmacological efficacy of pharmaceuticals permitting man or animals to increase the production of neurotransmitter amines, namely, erotin, on the one hand, and dopamine and noradrenaline, on the other. By way of example tranquilizers may be increased in the course of transporting animals which have received a product according to the invention.

Taking account of the physical form of the new products (soluble powder in an aqueous medium) the form in which it is presented does not give rise to any difficulties. The novel products may be administered as such by the enteral tract or, for example, mixed with a common foodstuff.

Doses of 0.1 to 2 g/kg per day are suitable.

The invention will now be illustrated without in any way being limited thereby, with reference to the examples hereinbelow.

EXAMPLE 1

In this example a rennet type whey is used as the starting material. This whey was obtained by coagulation of skim milk, heat treated (72° C. for 15 seconds), not cooled, with 30 ml of Boll rennet ($10^{-4}$) then filtered.

After storing it for 18 hours at 4° C. the whey was ultrafiltered at 45° C. in a DC 10 ultrafiltration module with an XM 50 membrane (1.4 sq m) sold by Romicon. XM 50 membranes are indicated by the manufacturer as having a cut-off in the vicinity of 50,000. The DC 10 ultrafiltration module uses membrane of the hollow fiber type, bunched in tubular bundles. The ultrafiltration permeate was recovered and its composition was followed with time. The results are tabulated in table 1 below:

TABLE 1

|  | NPN g/l | NT g/l | NPN/$N_T$ | NT/ES |
|---|---|---|---|---|
| $UF_o$ | 0.237 | 2.1 | 0.72 | 3.1% |
| $UF_{1H}$ | 0.250 | 2.6 | 0.62 |  |
| $UF_{2H}$ | 0.262 | 3.0 | 0.56 |  |
| $UF_{3H}$ | 0.255 | 2.9 | 0.57 |  |
| $UF_{4H30MIN}$ | 0.259 | 2.5 | 0.47 |  |
| $UF_{5H50MIN}$ | 0.243 | 3.9 | 0.40 | 6.1% |

The ultrafiltrate obtained from the first ultrafiltration through the XM 50 membrane was collected and again ultrafiltrated through am $AM_2$ membrane at 15° C. also by using a DC 10 ultrafiltration module by Romicon. The surface area of the membrane was also equal to 1.4 sq. m. and the membrane was of the hollow fiber type. The $AM_2$ membrane comprises a cut-off of the order of 2,000. The change of the composition of the retentate in the course of this second ultrafiltration is tabulated in Table 2 which follows.

TABLE 2

|  | Retentate | | Permeate | |
|---|---|---|---|---|
|  | Prot. | $NPN_{6.38}$ | $N_T$ | $ES_{g/l}$ |
| $A_o$ | 3.1 | 1.5 | 1.6 | 57.0 |
| $A_{22}$ | 4.5 | 1.7 | 1.6 |  |
| $A_{42}$ | 5.3 | 1.7 | 1.7 |  |
| $A_{62}$ | 7.1 | 1.8 | 1.7 |  |
| $A_{82}$ | 8.0 | 1.9 | 1.7 | 60.3 |
| $A_F$ | 12.4 | 2.1 | 1.7 | 60.7 |

Figure 2:
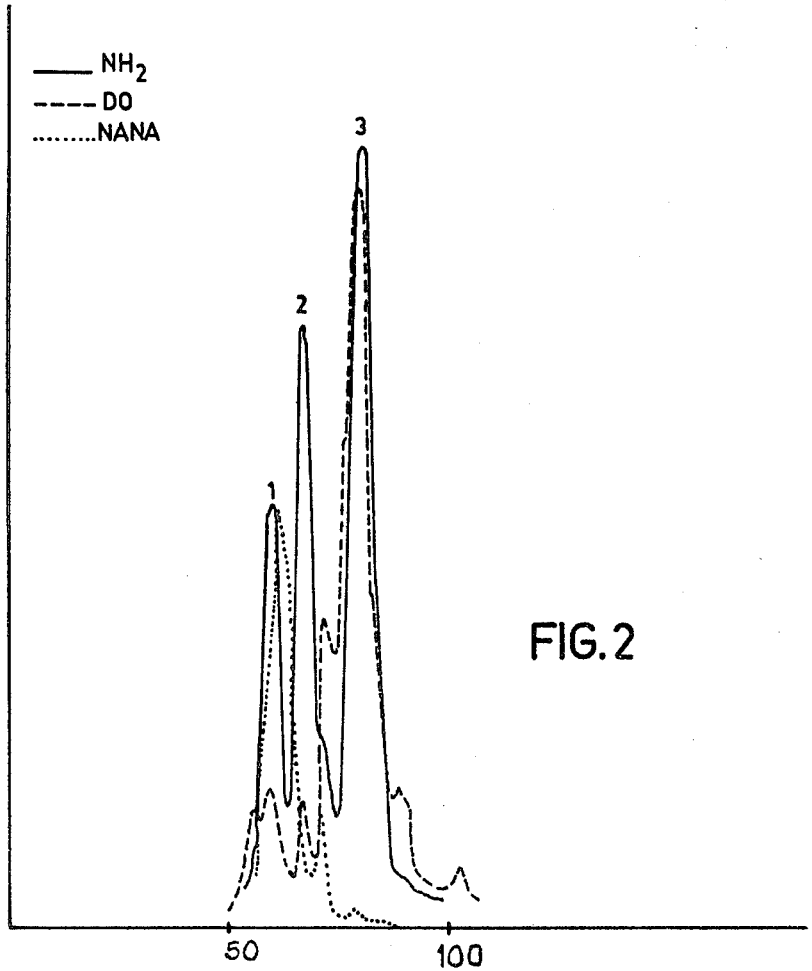

In order to analyze and therefore charactirize the final retentate, it was filtered through a G 75 gel in a phosphate buffer medium (pH 7.0) on a column (2 m × 0.02) at a flow rate of 15 ml/h. The metering was effected on an eluent of neuraminic acid, the optical density measurement at 230 nm and the measuring of the ninhydrin at 750 nm. The results are illustrated by FIG. 2. The main peaks may be distinguished therein.

1. $DO_{230}$ low/$NH_2$ 570 NaNa high
2. $DO_{280}$ low/$NH_2$ 570
3. $DO_{280}$ high/$NH_2$ 570

The analysis of the entire sample of electrophoresis and the different peaks is proof that the retentate comprises a mixture of α-lactalbumin, β-lactoglobulin and glyclosyl or nonglycosyl CMP.

In order to determine the respective amounts, the soluble nitrogen was metered in different strengths of trichloroacetic acid [see K. Fox et al., Separation of β-lactoglobulin from Other Milk Serum Proteins by Trichloracetic acid, Journal of Dairy Science, Vol. 50., No 9, pp 1363–1367, 1967]. It is then shown that:

at 2% about 75% of the β-lactoglobulin, all the CMP and a residue of α-lactalbumin-soluble nitrogen (peptides + free amino acids) remain soluble:

at 4% about 50% of the β-lactoglobulin, all the CMP and an β-lactalbumin-soluble-soluble-N (peptides + free amino acids) remain soluble;

at 6% all the CMP-soluble N remains soluble; and at 12% all the glycosyl CMP-soluble N remains soluble;

| Results: | | | |
|---|---|---|---|
| 2% | 4% | 6% | 12% |
| ppm of N | | | |
| 262 | 224 | 183 | 119 |

The product corresponds to approximately the following composition by weight:

| lactalbumin | 47% |
|---|---|
| lactoglobulin | 20% |
| CMP | 25% |
| soluble | 8% |

From the above figures and the amino acid composition of each of the constituents the theoretical aminogram was determined which was compared with the real aminogram.

We found a coefficient of correlation of 0.96. By disregarding the glutamic acid and the proline which are known to be the chief amino acids of the soluble phase of the U.F. permeate (Hargrove et al., J. Dairy Science, 59, 25–33, 1976) the coefficient becomes 0.986 which is in good correlation with acutal values.

It is interesting to note owing the presence of α-lactalbumin, the richness of tryptophan (nearly twice as great as the normal percentage of the initial concentrate).

|  | Theoretical model (soluble) | Aminogram |
|---|---|---|
| Ile | 7.6 | 6.8 |
| Leu | 8.9 | 8.2 |
| Hys | 8.7 | 8.8 |
| Met | 1.6 | 1.6 |
| Cyst | 3.7 | 2.4 |
| Phe | 2.8 | 3.1 |
| Tyr | 3.3 | 3.3 |
| Thr | 7.8 | 7.0 |
| Trp | 3.4 | 3.3 |
| Val | 5.3 | 5.8 |
| Ars | 1.1 | 1.6 |
| His | 1.7 | 1.9 |
| Ala | 3 | 3.7 |
| Asp | 11.5 | 11.2 |
| Glu | 13.9 | 18.1 |
| Gly | 2.0 | 2.3 |
| Pro | 4.7 | 6.1 |
| Ser | 5.0 | 4.7 |

The product is moreover very soluble and has an agreeable sweet tast which is caused by the presence of the glycosyl CMP.

EXAMPLE 2

In this example a lactic whey was treated. The whey coming from lactic coagulation has no CMP.

The coagulation of the milk was obtained by the addition of lactic acid up to a pH of 4.6. After removing the curd, the pH was adjusted to a pH 6.6 by adding potassium hydroxide 2/1000 trisodium citrate was added to avoid the problems of clogging the membranes with calcium salts. Prior to ultrafiltration the acid whey was subjected to centrifugation at 1000 g for 15 minutes.

Ultrafiltration was then carried out at 25° C. in a DC 10 ultrafiltration module with XM 50 membranes (see Example 1). The compositions of the permeate and the retentate during ultrafiltration are indicated in table 3.

The previously obtained ultrafiltrate was then again ultrafiltered across an AM₂ membrane with a Romicon DC 10 module at 15° C. The compositions of the retentate and the permeate are recorded in table 4.

The retentate of the second ultrafiltration which constitutes the sought product therefore has the following approximate composition by weight:

| β-lactoglobulin | 37% |
|---|---|
| α-lactalbumin | 56% |
| 1% soluble nitrogen | 7% |

Figure 3:
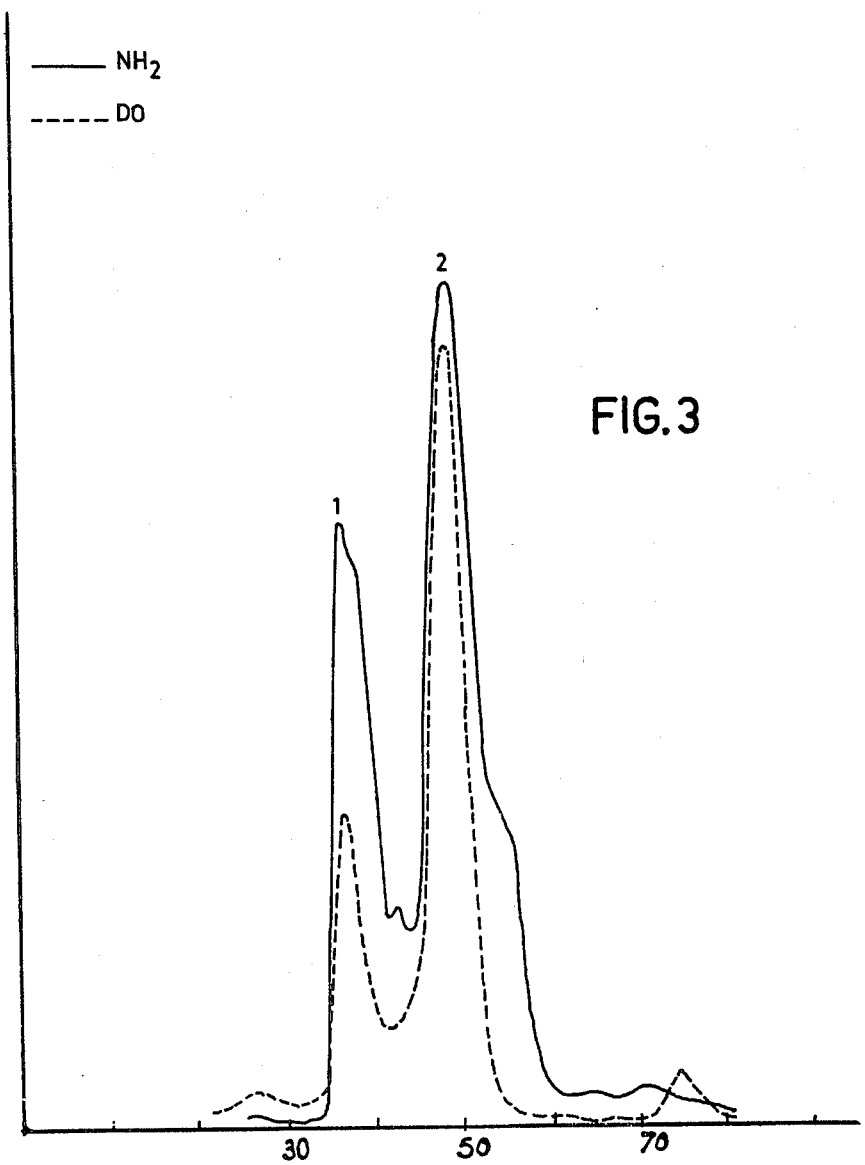

Ultrafiltration through a gel performed in the same conditions as in Example 1 but in a column one meter high containing G 75 gel clearly shows the peak 1 corresponding to the α-lactalbumin and peak 2 corresponding to β-lactoglobulin. FIG. 3 of the accompanying drawings corresponds to this case.

The theoretical aminogram of this protein solution would be:

| Ile | 6.4 | Val | 4.9 |
|---|---|---|---|
| Leu | 12.2 | Arg | 1.7 |
| Lys | 10.2 | His | 2.2 |
| Met | 1.7 | Ala | 3.8 |
| Cys | 4.8 | Asp | 14.7 |
| Phe | 3.8 | Glu | 14.4 |
| Tyr | 4.4 | Gly | 23 |
| Thr | 4.9 | Pro | 2.7 |
| Trp | 4.4 | Ser | 4.2 |

EXAMPLE 3

This example concerns the preparation of milk having the composition of mother's milk. A product which satisfies this requirement has the following composition:

| Proteins | 1.65 g |
|---|---|
| of which 0.82 g of the product of example 1 or 2 above | |
| of which 0.83 g of total milk proteins | |
| Lipides | 3.5 g |
| of which vegetable oil rich in polyunsaturated acids or fatty acids: 1 g | |
| Glucides: lactose | 7.5 g |
| Vitamins A,E,B₁,B₂,B₆,B₁₂,PP,Calcium penthotenate, folic acid, vitamin, C, biotine, K | according to the recommandations of ESPGAN* Commmittee on Nutrition "Guidelines on Infant Nutrition" 1976 |
| Nutrition Minerals iron, sodium, calcium, potassium, magnesium, manganese, phosphorus chlorine, copper, zinc. | according to the recommandation of ESPGAN Committee on Nutrition "Guidelines on Infant Nutrition", 1974 |

*European Society for Pediatric Gastroenterology and Nutrition.

EXAMPLE 4

This example is concerned with an intensive-care product enterally administered to patients requiring a protein intake of the order of 7 to 12% of the Total Caloric Intake. Such a product satisfies nutritional requirements in case of mucoviscidosis or cystic fibrosis of the pancreas, kidney disorders as well as patients suffering from an infection or inflammation of the intestinal wall. These proteins are preferably supplied in pre-digested form.

A suitable centesimal composition is the following:

| Proteins | | 2.50 g |
|---|---|---|
| of which 50% total milk proteins 50% of the product of the invention | | |
| Lipides a mixture of equal parts of: | | |
| butter oil | 0.5 g | |
| T.C.M. | 0.5 g | |
| corn oil | 0.5 g | 4.10 g |
| sunflower oil | 0.5 g | |
| glycerol monostearate | 2.1 g | |
| Glucides | | |
| glucose polymers | 10 g | |
| glucose | 1.5 g | 13.00 g |
| galactose | 1.5 g | |
| Vitamins A,D,E,B₁,B₂,PP,B₅ B₆,B₁₂,folic acid biotine, vit. C | | according to the recommendations of FAO/WHO 0.455 g |
| Minerals calcium, sodium, potassium magnesium, phosphorus, zinc iron, copper, manganese, chlorine, iodine | | |

EXAMPLE 5

This example relates to an intensive-care product usable through the enteral tract of patients necessitating a protein intake of the order of 23% of the total caloric intake in predigested form and a low lipidic intake. This may be the case with considerable tissue destruction after serious traumas and burns.

An appropriate centesimal composition is the following:

| | | |
|---|---|---|
| Proteins | | 8 g |
| of which 50% meat proteins | | |
| (trimmed and defatted beef) | | |
| 50% of the product according | | |
| to the invention | | |
| Lipides | | |
| T.C.M. | 1.40 g | |
| oil very rich | | |
| in essential | | 2.90 g |
| fatty acids | 1.40 g | |
| emulsifier | 0.10 g | |
| Glucides | | |
| small glucose | 12.7 g | |
| polymers | | |
| glucose | 3 g | 18.7 g |
| galactose | 3 g | |
| Vitamins | | |
| A,D,E,$B_1$,$B_2$,PP,$B_5$,$B_6$,$B_{12}$, | | according to FAO/WHO |
| folic acid, biotine, | | recommandations |
| vitamin C | | |
| Minerals | | |
| calcium, sodium, potassium, phosphorus, zinc, iron, copper, manganese, chlorine, iodine | | 0.455 g |
| Distilled water | | q.s.p. 100 |

TABLE 3

| | RETENTATE | | PERMEATE | | | | |
|---|---|---|---|---|---|---|---|
| | $N_T$ g/l | $NPN_{12\%}$ ppm | $N_T$ | $NPN_{12\%}$ | $NPN_{2\%}$ | ES | $NPN_{12\%}/N_T$ |
| C | 7.7 | 52.8 | | | | | |
| 1 | | | 2.0 | 294 | 220 | 58.1 | 70.2 |
| 2 | | | | 224 | | | |
| 3 | 16.3 | | 2.7 | 249 | | | 59.0 |
| 4 | | | | 242 | | | |
| 5 | 23.6 | | 3.2 | 241 | 326 | | 48.3 |
| 6 | | | | 243 | | | |
| 7 | | | | 245 | | | 50 |
| 8 | 24.8 | | 3.1 | 247 | 333 | | |
| 9 | | | | 254 | | | 52.7 |
| 10 | 25.8 | | | 256 | | | |
| fin. ret. | 21.2 | | | 262 | 314 | | |
| Average, permeate | | | 3.1 | 249 | 305 | 63.9 | |

Starting with the value $TCA_{2\%}$ and $TCA_{12\%}$ the average composition of the permeate is as follows:

N 450 ppm breaking down into:
- 60 ppm β-lactoglobulin — 13.3%
- 250 ppm soluble N — 55%
- 140 ppm α-lactalbumin — 31%

TABLE 4

| | RETENTATE | | | | | PERMEATE | | | |
|---|---|---|---|---|---|---|---|---|---|
| | $N_T$ g/l | $NPN_{2\%}$ ppm | $NPN_{12\%}$ ppm | ES g/l | $N_T$/ES | N | $NPN_{12}$ ppm | NPN/N | N/ES |
| 0 | 3.1 | 305 | 249 | 63.9 | 4.8 | | | | |
| 1 | | | | | | 1.40 | 198.4 | 88 | 2.7 |
| 2 | 4.5 | | | | | | | | |
| 3 | 5.5 | | 265 | 69.6 | 7.8 | 1.80 | | | |
| 4 | 6.8 | | | | | | | | |
| 5 | 9.1 | | 269 | 73.8 | 12.4 | 1.9 | | | |
| 6 | 9.7 | | | | | | | | |
| D | | | | | | | | | |
| 7 | 12.4 | | 203.1 | 54.3 | 22.9 | 1.4 | | | |
| 8 | 12.2 | | | | | | | | |
| 9 | 12.8 | 873 | 121 | 32.1 | 39.8 | 0.61 | 96 | 100 | 2.7 |
| / Ret. | 15.9 | | 132 | 35.3 | 45 | | | | |

/ Final retentate after concentration

What we claim is:

1. A process for obtaining an α-lactalbumin enriched product from raw acid whey or mixed whey, comprising:
    (a) adjusting the pH of the whey to between about 6.3 and 7, whereby a pH-adjusted whey is obtained,
    (b) subjecting the pH-adjusted whey to a first ultrafiltration on a membrane having a molecular weight cut-off adapted to retain soluble proteins, whereby a first ultrafiltrate is obtained,
    (c) separating the first ultrafiltrate,
    (d) subjecting the first ultrafiltrate to a second ultrafiltration on a membrane having a MW cut-off adapted to retain β-lactalbumin whereby a retentate is formed, and
    (e) collecting the retentate.

2. A process according to claim 1, wherein the cut-off of the membranes of the first ultrafiltration step is generally greater than 5,000.

3. A process according to claim 2, wherein the cut-off of the membrane of the second ultrafiltration step is less than 5,000.

4. A process according to claim 3, wherein the cut-off of the membrane of the second ultrafiltration step is between about 1,500 and 2,000.

5. A process according to claim 1 or 4, wherein the raw whey is used in the first ultrafiltration step prior to any heat treatment.

6. A process according to claim 1 or 4, wherein the whey is used in the first ultrafiltration step without undergoing pasteurization.

7. A process according to claim 1 or 4, comprising adjusting the pH of the raw whey to a value slightly less than 7.

8. A process according to claim 1 or 4, comprising adjusting the pH of the raw whey to a value about 6.6.

9. A process according to claim 1, wherein said pH adjustment step comprises adding a basic reagent.

10. A process according to claim 9, wherein the basic reagent is a compound selected among the group consisting of sodium hydroxide, potassium hydroxide, sodium carbonate, potassium carbonate, calcium hydroxide and ammonium hydroxide.

11. A process according to claim 9, wherein the basic reagent comprises potassium hydroxide.

12. A process according to claim 1 or 4, comprising carrying out the first ultrafiltration step at a temperature of 30° to 60° C.

13. A process according to claim 1 or 4 comprising carrying out the first ultrafiltration step at a temperature of the order of 45° C. with ultrafiltration membranes having a cut-off of the order of 50,000.

14. A process according to claim 1 or 4, comprising carrying out the second ultrafiltration step at ambient temperature or slightly lower.

15. A process according to claim 1 or 4, comprising carrying out the second ultrafiltration step at a temperature of the order of 15° C.

16. A process according to claim 14, the second ultrafiltration being a diafiltration comprising adding to the ultrafiltrate of the first ultrafiltration step pure water upstream of the ultrafiltration membrane for the second ultrafiltration.

17. A process according to claim 14, the second ultrafiltration being diafiltration comprising adding to the ultrafiltrate of the first ultrafiltration step an aqueous solution containing mineral salts upstream of the ultrafiltration membrane for the second ultrafiltration.

18. An α-lactalbumin enriched product of the ultrafiltration resulting from the process of claim 1, wherein the membrane of step (b) has a molecular weight cut-off of 50,000 daltons.

19. A product according to claim 18, containing practically no CMP when the starting raw whey is an acid whey.

20. The process of claim 1 wherein the raw whey is a mixed whey.

21. The process of claim 20 wherein the raw whey is an acid whey or casein whey.

22. The process of claim 1 wherein the raw whey is obtained from fresh curds.

23. The method of claim 1 wherein the raw whey is obtained from soft cheese curd or marbled cheese curd.

24. The method of claim 23 wherein the cheese is blue cheese.

25. The process of claim 1 wherein the raw whey is obtained by lactic coagulation of milk.

26. The process of claim 25 wherein the milk used is skim milk.

* * * * *